US012033002B2

(12) United States Patent
Tormasov et al.

(10) Patent No.: US 12,033,002 B2
(45) Date of Patent: Jul. 9, 2024

(54) SYSTEMS AND METHODS FOR OPTIMIZED EXECUTION OF PROGRAM OPERATIONS ON CLOUD-BASED SERVICES

(71) Applicant: Acronis International GmbH, Schaffhausen (CH)

(72) Inventors: Alexander Tormasov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 532 days.

(21) Appl. No.: 17/307,058

(22) Filed: May 4, 2021

(65) Prior Publication Data
US 2021/0349764 A1    Nov. 11, 2021

Related U.S. Application Data

(60) Provisional application No. 63/020,098, filed on May 5, 2020.

(51) Int. Cl.
*G06F 9/50* (2006.01)
*G06F 9/48* (2006.01)
*G06N 20/00* (2019.01)

(52) U.S. Cl.
CPC .......... *G06F 9/5055* (2013.01); *G06F 9/4881* (2013.01); *G06F 9/5077* (2013.01); *G06N 20/00* (2019.01)

(58) Field of Classification Search
CPC .... G06F 9/5055; G06F 9/4881; G06F 9/5077; G06N 20/00
See application file for complete search history.

(56) References Cited

U.S. PATENT DOCUMENTS

| | | | |
|---|---|---|---|
| 9,043,658 B1* | 5/2015 | Marr | G06F 12/14 702/182 |
| 10,419,483 B1* | 9/2019 | Allen | G06F 9/45516 |
| 2013/0031559 A1* | 1/2013 | Alicherry | G06F 9/5077 718/104 |
| 2013/0185433 A1* | 7/2013 | Zhu | H04L 43/0876 709/226 |

(Continued)

*Primary Examiner* — Dong U Kim
(74) *Attorney, Agent, or Firm* — ArentFox Schiff LLP; Michael Fainberg

(57) ABSTRACT

Disclosed herein are systems and method efficiently executing a program operation on a cloud-based service. In an exemplary aspect, a method comprises receiving a request to perform a program operation on a cloud-based service and at least one user constraint for performing the program operation, and determining a plurality of sub-operations that are comprised in the program operation. The method comprises identifying a plurality of service component combinations offered by the service provider that can execute the program operation, and identifying, based on a status of each service component, at least one processing constraint of each service component. The method comprises determining, by a machine learning algorithm, a service component combination from the plurality of service component combinations for executing the program operation based on the at least one user constraint and processing constraints. The method comprises executing the program operation by the determined service component combination.

17 Claims, 3 Drawing Sheets

(56) References Cited

U.S. PATENT DOCUMENTS

| | | | | |
|---|---|---|---|---|
| 2014/0237477 A1* | 8/2014 | Cadambi | ............... | G06F 9/5044 |
| | | | | 718/103 |
| 2015/0220871 A1* | 8/2015 | Rajan | ............ | G06Q 10/063112 |
| | | | | 705/7.14 |
| 2019/0163517 A1* | 5/2019 | Fontoura | ................. | G06N 20/00 |
| 2020/0404051 A1* | 12/2020 | Guniguntala | ........... | H04L 67/10 |
| 2021/0019194 A1* | 1/2021 | Bahl | ................... | H04L 67/1031 |
| 2021/0294661 A1* | 9/2021 | Turner | ................... | G06Q 30/08 |

* cited by examiner

SYSTEMS AND METHODS FOR OPTIMIZED EXECUTION OF PROGRAM OPERATIONS ON CLOUD-BASED SERVICES

CROSS-REFERENCE TO RELATED APPLICATIONS

This application claims the benefit of U.S. Provisional Application No. 63/020,098, filed May 5, 2020, which is herein incorporated by reference.

FIELD OF TECHNOLOGY

The present disclosure relates to the field of cloud-based services, and, more specifically, to systems and methods for efficiently executing a program operation on a cloud-based service.

BACKGROUND

Cloud-based services allow for customers to store large amounts of data and run computationally-intensive algorithms through various pricing plans. Cloud-based storage services such as Amazon S3™ and Google Cloud Bigtable™ offer data storage infrastructures for storing and retrieving data. These services typically charge customers for the amount of machines they use, the amount of storage space occupied, the amount of network usage, etc. Likewise, cloud computational services such as Amazon Elastic Compute Cloud (EC2)™ offer virtual computers for rent so that customers may run their own applications. Such services may charge customers for the amount of time spent on the virtual computers, the operations performed (e.g., read/write), the amount of processing required, etc. In some cases, a cloud-based service may handle outsourced software development projects for various fees.

Ultimately, in order to perform any program operation, a customer may be charged with a considerable amount of money, even if the program operation does not require a significant amount of storage or computational power. For example, if a customer wishes to train a neural network on a compute cloud service, there may be various factors that dictate how to schedule the operations of the training to conserve both time and money. If the customer seeks to use a training dataset that is only 500 GB large, a plan that offers a base price for 1 TB of storage will be unnecessary and wasteful to both the service provider and the customer (as the customer will not use half of the storage and the service provider may not be able to provide the unused storage to another customer). Likewise, if the customer desires to train the neural network within ten hours, using a high-end GPU that is meant for more complicated computations may be far more expensive than a lower performance GPU that is cheaper, yet still capable of meeting the customer's deadline. From the service provider's perspective, the high-end GPU should rather be assigned to other customers that require more power than the lower performance GPU. From the customer's perspective, the lower performance GPU may fit within the customer's budgetary and timely needs; thus, the high-end GPU is unnecessary.

Furthermore, program operations may be split into smaller tasks that can be scheduled to drive efficiency up, and costs and time down. Conventional methods for determining how to utilize cloud-based services do not provide multi-criteria optimization, leaving customers and service providers with mismanaged resources, money, and time.

SUMMARY

To address these shortcomings, aspects of the present disclosure describe methods and systems for efficiently executing a program operation on a cloud-based service.

In an exemplary aspect, a method comprises receiving both a request to perform a program operation on a cloud-based service of a service provider and at least one user constraint for performing the program operation. The method comprises determining a plurality of sub-operations that are comprised in the program operation. The method comprises identifying a plurality of service component combinations offered by the service provider that can execute the program operation, wherein each of the plurality of service component combinations comprises at least one service component that can execute the plurality of sub-operations. The method comprises querying a status of each service component in the plurality of service component combinations. The method comprises identifying, based on the status, at least one processing constraint of each service component. The method comprises determining, by a machine learning algorithm, a service component combination from the plurality of service component combinations for executing the program operation, wherein the machine learning algorithm is configured to identify a respective service component combination that meets the at least one user constraint despite any processing constraints associated with respective service components of the respective service component combination. The method further comprises executing the program operation by the determined service component combination.

In some aspects, the at least one processing constraint is identified based on a type of the at least one user constraint.

In some aspects, the type of the at least one user constraint is temporal, and the at least one user constraint comprises a deadline for completing the program operation. The method comprises identifying at least one processing constraint of each service component by determining a maximum processing speed of each service component based on the status, determining a maximum memory of each service component based on the status, determining a network bandwidth accessible to each service component based on the status, and assigning, as the at least one processing constraint, a confidence score to each service component indicative of whether the deadline will be met based on the maximum processing speed, the maximum memory, and the network bandwidth.

In some aspects, the type of the at least one user constraint is financial, and the at least one user constraint comprises a budget for completing the program operation. The method comprises identifying at least one processing constraint of each service component by retrieving a pricing model that indicates various pricing options for performing each sub-operation of the plurality of sub-operations by each service component, determining a respective cost for each of the plurality of service component combinations, and assigning, as the at least one processing constraint, a budgetary score to each of the plurality of service component combinations indicative of whether the budget will be met based on the respective cost.

In some aspects, the machine learning algorithm assigns weights to the at least one user constraint and the at least one processing constraint such that one constraint has a greater influence than another constraint.

In some aspects, the status of each service component indicates an availability of each service component to perform a sub-operation. The method comprises determining that a subset of service components are unavailable to perform the plurality of sub-operations such that the machine learning algorithm cannot determine an appropriate service component combination. In response to determining that the machine learning algorithm cannot determine an appropriate service component combination, the method comprises estimating when the subset of service components will be available, determining a schedule that indicates when to select a given service component to perform a sub-operation of the plurality of sub-operations based on the estimation, evaluating whether the schedule satisfies the at least one user constraint. In response to determining that the schedule satisfies the at least one user constraint, the method comprises executing the program operation in accordance with the schedule.

In some aspects, in response to determining that the schedule does not satisfy the at least one user constraint, the method comprises transmitting an error message for performing the program operation.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for scheduling program operations on cloud-based services. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
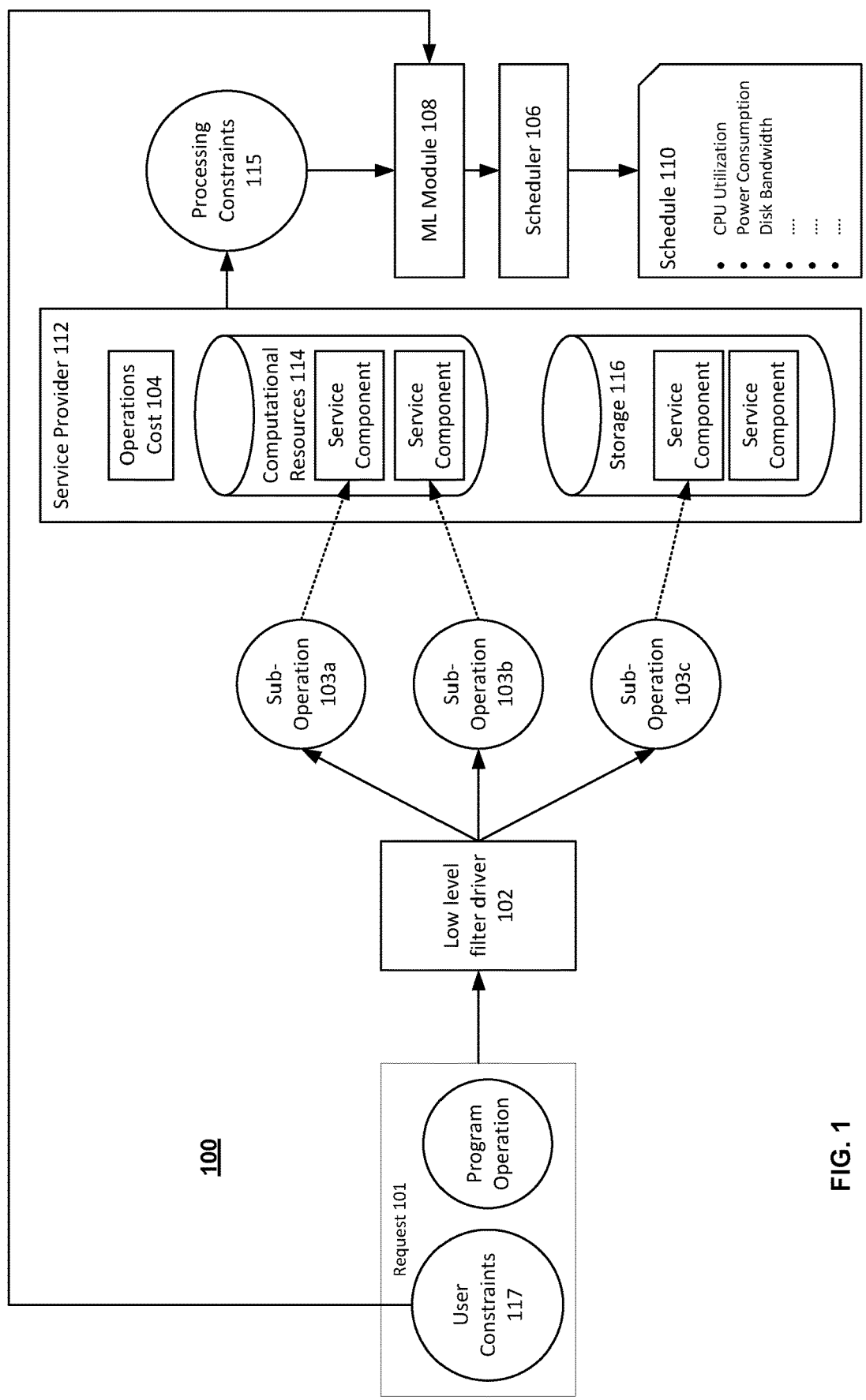
FIG. 1 is a block diagram illustrating a system for efficiently executing a program operation on a cloud-based service.

FIG. 1 is a block diagram illustrating system 100 for efficiently executing a program operation on a cloud-based service. As discussed previously, customers may use cloud-based services with payable elements for the implementation of program operations (e.g., transferring data, running an application, training a neural network, etc.). Accordingly, the cost of performing these program operations can be optimized/scheduled based not only on generic requests from the customer, but also by translating a program operation into a sequence of requests, each of which has an associated constraint (e.g., a direct cost). In other words, any program operation (for any type of software or service) can be measured in terms of its processor operations, input/output operations, requests on search, reading, writings etc.

Consider an example in which a data center provides data storage services. The program operation may be to store a certain amount of data on a server. The cost of storage may depend on many factors (e.g., whether access to this data is needed during storage, the frequency of access, the frequency of shifting the data, periodic integrity verification of the data, etc.). The occupied storage space can be used in passive mode (i.e., when data is placed on the server once) or in active mode (i.e., when data is regularly updated, old entries are deleted, and new entries are added). Thus the program operation can be represented as a set of low-level sub-operations (e.g., reading, writing, the number of hours of processor time, etc.) and the corresponding storage model can be substantially adjusted.

In system 100, a customer may provide low level filter driver 102 with request 101 to perform a program operation. Request 101 may also include user constraints 117. User constraints 117 represent the requirements of the user in terms of how the program operation should be performed. Constraints 117 may include, but are not limited to, a monetary budget, a time deadline, an access frequency (e.g., how often the user will perform the operation or access data), a security requirement (e.g., who/when/how someone may access the program operation), and hardware/software preferences (e.g., a user wants to use a GPU instead of a CPU for processing, a user wants to use a particular operating system, etc.). Driver 102 is a module that determines the sub-operations 103 (used interchangeably with low-level operations) that make up the program operation. It should be noted that although only three sub-operations 103a, 103b, and 103c are shown, one skilled in the art will appreciate that a program operation of request 101 may be split into any number sub-operations. For example, the program operation of uploading data onto storage 116, which may be the storage infrastructure of service provider 112, may comprise sub-operations including (1) identifying the server/node to store the data, (2) transferring the data over a network connection, (3) writing the data onto a disk of the server, (4) indexing the data, and (5) verifying data integrity. Driver 102 may refer to a database comprising predetermined breakdowns of a plurality of program operations. The database may list the program operations in one column and the sequences of sub-operations that achieve the respective program operations in another column.

Low level filter driver 102 may further identify a plurality of service component combinations offered by a service provider 112 (e.g., Amazon Web Services) that can execute the program operation, wherein each of the plurality of service component combinations comprises at least one service component that can execute the plurality of sub-operations 103. Service components can be a part of computational resources 114 (e.g., a CPU, a GPU, etc.) or storage 116 (e.g., servers with varying performance features for handling storage and data retrieval). Driver 102 may match each sub-operation to a particular service component. In some aspects, multiple sub-operations may be assigned to one service component. For example, suppose that a user is attempting to train a neural network to classify images. Driver 102 may determine that this program operation comprises a plurality of sub-operations including (1) uploading the training dataset, (2) uploading the program code and libraries associated with the neural network, (3) writing the uploaded information to a server, (4) executing the program code to train the neural network.

These sub-operations may be performed using various service components. For example, in terms of computational resources 114, a service provider 112 such as Amazon Web Services may utilize different computers with their unique hardware configurations (part of Amazon EC2). In some aspects, depending the storage size of the training datasets and the libraries, service components in storage 116 may be used (i.e., servers throughout the world with their own reading/writing and access latency capabilities). In this case, a plurality of service component combinations may include (1) a particular processor and storage device, (2) a particular processor, a GPU, and a storage device, etc. For example, in EC2, a Mac instance may be used (e.g., Intel core i7 processor with 3.2 Ghz, 6 physical cores, 32 GiB of memory) with a particular network bandwidth, a T4g instance may be used (e.g., Graviton2 Processor with 64-bit Arm Neoverse cores) with various network bandwidth configurations, or any other instance may be used as a service component. In addition, a particular storage configuration part of Amazon S3 may be used. In other words, any combination of service components offered by service provider 112 that can execute the program operation is determined by driver 102 using a service component list offered by service provider 112.

Service provider 112 may also provide driver 102 with operations cost 104. Operations cost 104 is a pricing model that may be a data structure listing the prices for utilizing various service components. Based on this, driver 102 may determine the monetary costs for performing the plurality of sub-operations. Operations cost 104 may be periodically updated by service provider 112 offering the sub-operation functionality as a service. Referring to the sub-operations of the storage example, operations cost 104 may directly or indirectly (i.e., based on how a service component is used for a certain time period) indicate (1) the prices of using different servers in various locations, (2) the usage costs of network bandwidth, (3) the costs for performing the writing operation, (4) the costs for creating an index, and (5) the costs for generating hash values for data integrity verification.

Scheduler 106 is a module that receives the plurality of sub-operations from driver 102 and the individual pricing options for each sub-operation. Based on the received information, scheduler 106 may execute an optimization algorithm that enables request 101 to be fulfilled while minimizing the cost for performing the program operation of request 101. For example, scheduler 106 may select a minimum number of servers that are cheap (for reducing the costs for sub-operation (1)), close to the customer (for reducing network bandwidth costs), and have lower-end processing capabilities (as they generally cost less to perform various operations).

Despite providing a plurality of service components, service provider 112 may have a finite amount of resources. Taking inventory of which service components are being utilized and when they will be free allows driver 102 to determine processing constraints 115. Similar to user constraints 117, which indicate the limitations or requirements set by the user, processing constraints 115 indicate the limitations or requirements set by the service provider 112. Processing constraints 115 may include, but are not limited to, health status of a service component (e.g., is a server down for repair or has it malfunctioned completely), a usage rate of a service component (e.g., is a server being used to maximum usage threshold such as a storage cap), and administrative policies (e.g., is a service component reserved for usage by a particular user and/or client of service provider 112).

In an exemplary aspect, driver 102 queries a status of each service component in the plurality of service component combinations. A status may indicate "unavailable" or "available." In some aspects, if a service component is available, the status may further indicate a usage percentage (e.g., 70% CPU usage, 50% storage usage, etc.). The status may also indicate the hardware capabilities of each service component. In some aspects, driver 102 may remove combinations from the plurality of service component combinations for which at least one service component is "unavailable."

Based on the status, driver 102 may determine a processing constraint of each service component. In some aspects, a processing constraint is identified based on a type of the user constraint in a user request. For example, the type of a user constraint may be temporal (i.e., the user constraint comprises a deadline for completing the program operation). Accordingly, driver 102 may identify at least one processing constraint of each service component by determining, based on the status, a maximum processing speed and a maximum memory of each service component as well as a network bandwidth accessible to each service component. Driver 102 may then assign, as the at least one processing constraint, a confidence score to each service component indicative of whether the deadline will be met based on the maximum processing speed, the maximum memory, and the network bandwidth. For example, if the deadline for uploading and storing all user data in one hour, driver 102 may determine whether it is physically possible for a service component combination to meet the deadline based on at least the three attributes determined. The confidence score may be a function of the three attributes, an expected completion time, and the budgeted time. For example, if the maximum processing speed is 2.5 Ghz, the maximum memory is 4 Gb, and the network bandwidth is 300 Mbps, the driver 102 may determine that the program operation will take 30 hours to complete. If the budgeted time is 20 hours, the confidence score may be the difference between the expected completion time and the budgeted time (i.e., −10). A negative value represents that the combination will take more than the budgeted time to complete execution of the program operation (e.g., train a neural network, store data, etc.).

In some aspects, the type of the user constraint is financial and the at least one user constraint comprises a budget for completing the program operation. Thus, driver 102 may identify the processing constraint of each service component by retrieving a pricing model provided by operation costs 104 that indicates various pricing options for performing each sub-operation of the plurality of sub-operations by each service component. Driver 102 may then determine a respective cost for each of the plurality of service component combinations. For example, using a particular combination for one hour may cost $10. If the user's budget is $200 and the program operation will cost $300 (i.e., 30 hours for the particular combination to perform the program operation), the combination will not meet the user constraint. Driver 102 may assign, as the at least one processing constraint, a budgetary score to each of the plurality of service component combinations indicative of whether the budget will be met based on the respective cost. In some aspects, the budgetary score is a difference between the user budget and the respective cost. If a combination will be over budget, the budgetary score will be negative. The lower the score is, the less likely the combination will be used.

Machine learning (ML) module 108 may be a software component of driver 102 or may communicate with driver 102 as an independent entity. ML module 108 is configured to identify a respective service component combination from the plurality of service component combinations that meets at least one user constraint despite any processing constraints associated with respective service components of the respective service component combination. In some aspects, ML module 108 is a classifier that determines whether a service component combination is suitable based on the user constraints and the processing constraints.

An input vector for ML module 108 may indicate a user request, user constraints, and processing constraints. As there may be multiple ways to express a user request, driver 102 may parse the user request into space required (e.g., 20 GB), user device configuration (e.g., upload speed of the device where data is originating from to be shifted to the cloud), and one of a pre-categorized request type (e.g., training, streaming, storing, privacy, etc.). Thus, an example input vector may be <500, 1, storage, 1, 10, −1, 3> implying that there is 500 Gb of data involved, 1 Mbps is the user's upload speed, storage is the key goal, 1 hour is the user's time budget, $10 is the monetary budget, the service combination is expected to complete the upload in two hours (one hour over budget), and the service combination will cost $7 ($3 under budget). This is only a basic example as the input vector may include more categories depending on the constraints associated with a program operation.

ML module 108 may be trained with a similar input vector training dataset and ultimately outputs "yes" or "no." In this case, a "yes" would indicate that the service component combination can be recommended to the user and a "no" would indicate that the service component combination should not be recommended. ML module 108 may assign, during training, weights to the at least one user constraint and the at least one processing constraint such that one constraint has a greater influence than another constraint (e.g., money matters more than time).

In some aspects, of the plurality of service component combinations, ML module 108 may determine that none of the service component combinations available are suitable for the user's request and that the unavailable service component combinations would be suitable if they were available. For example, ML module 108 may determine that a subset of service components are unavailable to perform the plurality of sub-operations such that it cannot determine an appropriate service component combination. In response, driver 102 may estimate when the subset of service components (i.e., the unavailable service components) will be available. For example, driver 102 may request updated statuses from service provider 112 to estimate a time when the service component can take on a new sub-operation. Scheduler 106 may then determine a schedule that indicates when to select a given service component to perform a sub-operation of the plurality of sub-operations based on the estimation. Scheduler 106 may evaluate whether the schedule satisfies the at least one user constraint (e.g., whether the user's time deadline will be met). In response to determining that the schedule (e.g., schedule 110) satisfies the at least one user constraint, driver 102 may instruct service provider 112 to execute the program operation in accordance with the schedule. However, in response to determining that the schedule does not satisfy the at least one user constraint, driver 102 may transmit an error message for performing the program operation.

In a more specific example, scheduler 106 may determine the amount of time each schedule of the plurality of schedules will take to perform the plurality of sub-operations. Scheduler 106 may then select that cheapest schedule that meets the time requirement. In some aspects, the scheduler 106 may apply weights to each parameter based on which parameter is more important to the user. For example, if the user prefers speed over cost (while still maintaining low costs), scheduler 106 may select the fastest schedule that is under a maximum price set by the user.

In some aspects, scheduler 106 may specifically determine a plurality of schedules based on the amount of data to be stored, the number of operations to be performed, the loading of the CPU/GPU, etc., and their associated costs. Each schedule of the plurality of schedules may indicate a unique configuration of services offered by service provider 112 for performing the plurality of sub-operations. For example, if request 101 seeks to store 500 GB of data on storage 116, scheduler 106 may determine a first schedule that stores the data on a server in London and a second schedule that stores the data on a server in New York City. Each schedule may be associated with its own server usage price, network usage price, etc. Scheduler 106 may then select the schedule with the lowest price.

Scheduler 106 ultimately generates schedule 110, which indicates the plurality of sub-operations to perform, the selection of services offered by service provider 112 that minimizes customer costs, and configuration details (e.g., CPU utilization, power consumption, disk bandwidth, etc.) associated with performing each of the plurality of sub-operations. Schedule 110 is transmitted to service provider 112, which may execute the program operation as a plurality of sub-operations using computational resources 114 and storage 116 in accordance with schedule 110.

It should be noted that driver 102 may be on the service provider side or the customer side. For example, when executing the program operation by the determined service component combination, driver 102 on the service provider 112 may instruct each the components in the determined combination to execute the respective sub-operations. If driver 102 is on the customer side, driver 102 will instruct service provider 112 to execute the program operation with the determine combination.

In some aspects, service provider 112 may design an operating system that works on the base of paid memory and has an embedded mechanism for cost estimation of system resources, like CPU, disk bandwidth, power consumption. Service provider 112 may design the operating system in accordance with the configuration details specified in schedule 110 to perform the plurality of sub-operations.

In some aspects, scheduler 110 utilizes machine learning (ML) module 108, which is trained to output a schedule that minimizes the total cost of performing the plurality of sub-operations.

Figure 2:
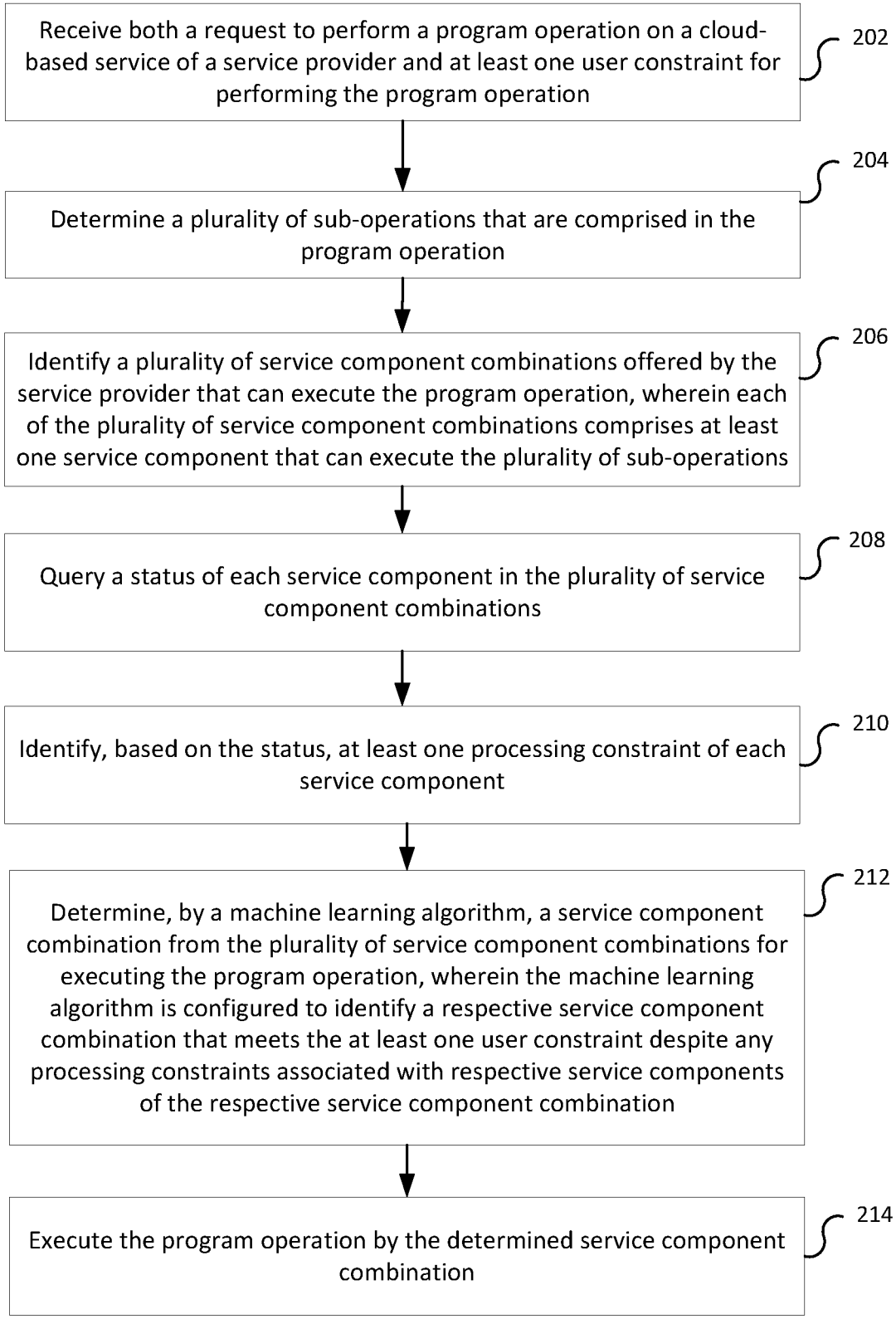
FIG. 2 illustrates a flow diagram of a method for efficiently executing a program operation on a cloud-based service.

FIG. 2 illustrates a flow diagram of method 200 for efficiently executing a program operation on a cloud-based service. At 202, method 200 comprises receiving both a request to perform a program operation on a cloud-based service of a service provider and at least one user constraint for performing the program operation. At 204, method 200 comprises determining a plurality of sub-operations that are comprised in the program operation. At 206, method 200 comprises identifying a plurality of service component combinations offered by the service provider that can execute the program operation, wherein each of the plurality of service component combinations comprises at least one service component that can execute the plurality of sub-operations. At 208, method 200 comprises querying a status of each service component in the plurality of service component combinations. At 210, method 200 comprises identifying, based on the status, at least one processing constraint of each service component. At 212, method 200 comprises determining, by a machine learning algorithm, a service component combination from the plurality of service component combinations for executing the program operation, wherein the machine learning algorithm is configured to identify a respective service component combination that meets the at least one user constraint despite any processing constraints associated with respective service components of the respective service component combination. At 214, method 200 comprises executing the program operation by the determined service component combination.

Figure 3:
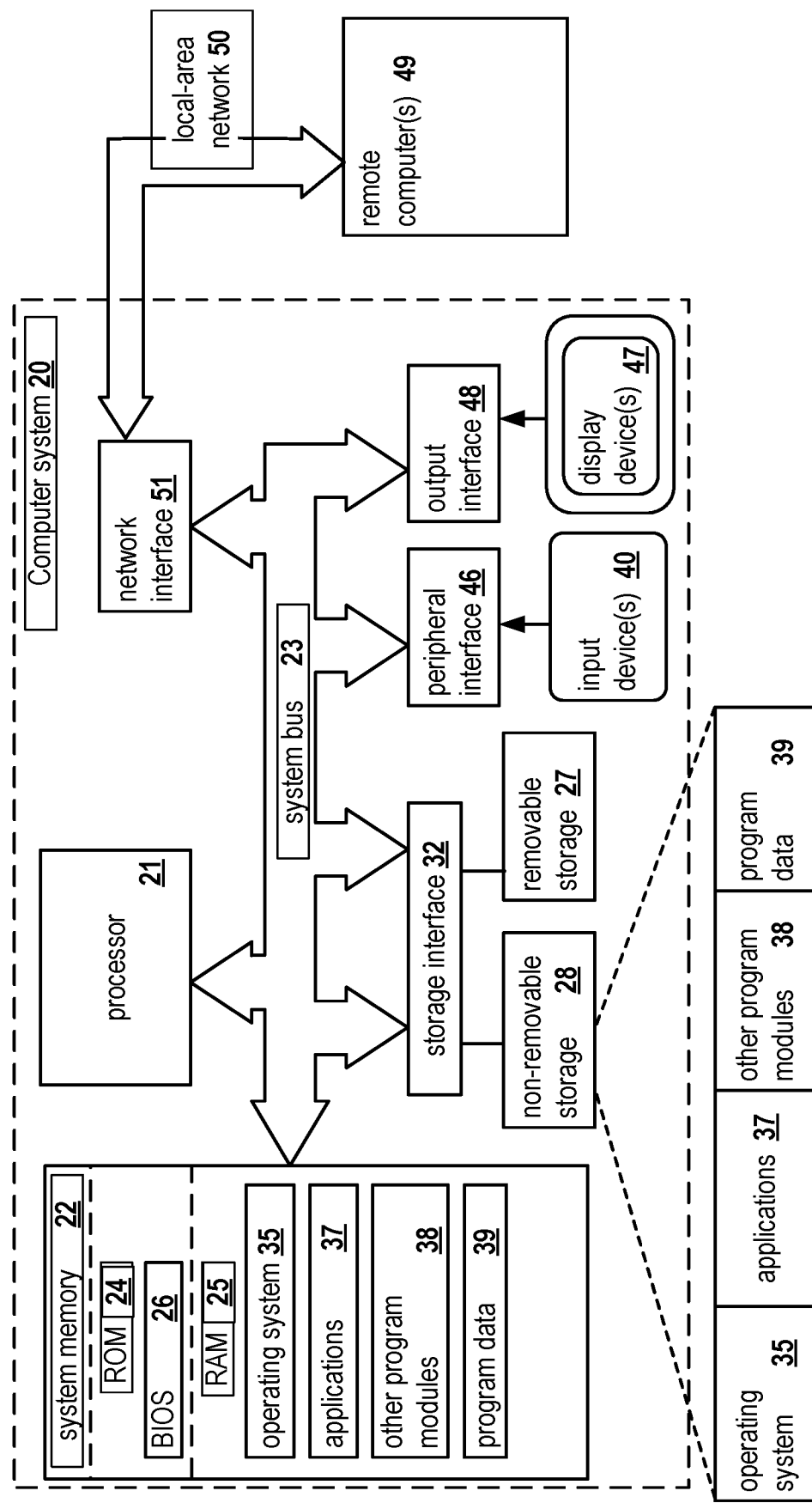
FIG. 3 presents an example of a general-purpose computer system on which aspects of the present disclosure can be implemented.

FIG. 3 is a block diagram illustrating a computer system 20 on which aspects of systems and methods for scheduling program operations on cloud-based services may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for scheduling program operations on cloud-based services, the method comprising:
receiving both a request to perform a program operation on a cloud-based service of a service provider and at least one user constraint for performing the program operation, wherein the at least one user constraint comprises a deadline for completing the program operation;
determining a plurality of sub-operations that are comprised in the program operation;
identifying a plurality of service component combinations offered by the service provider that can execute the program operation, wherein each of the plurality of service component combinations comprises at least one service component that can execute the plurality of sub-operations;
querying a status of each service component in the plurality of service component combinations;
identifying, based on each queried status, at least one processing constraint of each service component, by:
determining a maximum processing speed, maximum memory, and accessible network bandwidth of each service component based on each queried status; and
assigning, as the at least one processing constraint, a confidence score to each service component indicative of whether the deadline will be met based on the maximum processing speed, the maximum memory, and the accessible network bandwidth;
determining, by a machine learning algorithm, a service component combination from the plurality of service component combinations for executing the program operation, wherein the machine learning algorithm is configured to identify a respective service component combination that meets the at least one user constraint despite any processing constraints associated with respective service components of the respective service component combination; and executing the program operation by the determined service component combination.

2. The method of claim 1, wherein the at least one processing constraint is identified based on a type of the at least one user constraint.

3. The method of claim 2, wherein the type of the at least one user constraint is financial, and wherein the at least one user constraint comprises a budget for completing the program operation, further comprising identifying at least one processing constraint of each service component by:
retrieving a pricing model that indicates various pricing options for performing each sub-operation of the plurality of sub-operations by each service component;
determining a respective cost for each of the plurality of service component combinations; and
assigning, as the at least one processing constraint, a budgetary score to each of the plurality of service component combinations indicative of whether the budget will be met based on the respective cost.

4. The method of claim 1, wherein the machine learning algorithm assigns weights to the at least one user constraint and the at least one processing constraint such that one constraint has a greater influence than another constraint.

5. The method of claim 1, wherein the status of each service component indicates an availability of each service component to perform a sub-operation, further comprising:
determining that a subset of service components are unavailable to perform the plurality of sub-operations such that the machine learning algorithm cannot determine an appropriate service component combination; and
in response to determining that the machine learning algorithm cannot determine an appropriate service component combination:
estimating when the subset of service components will be available;
determining a schedule that indicates when to select a given service component to perform a sub-operation of the plurality of sub-operations based on the estimation;
evaluating whether the schedule satisfies the at least one user constraint; and
in response to determining that the schedule satisfies the at least one user constraint, executing the program operation in accordance with the schedule.

6. The method of claim 5, further comprising in response to determining that the schedule does not satisfy the at least one user constraint, transmitting an error message for performing the program operation.

7. A system for scheduling program operations on cloud-based services, the system comprising:
a hardware processor configured to:
receive both a request to perform a program operation on a cloud-based service of a service provider and at least one user constraint for performing the program operation, wherein the at least one user constraint comprises a deadline for completing the program operation;
determine a plurality of sub-operations that are comprised in the program operation;
identify a plurality of service component combinations offered by the service provider that can execute the program operation, wherein each of the plurality of service component combinations comprises at least one service component that can execute the plurality of sub-operations;
query a status of each service component in the plurality of service component combinations;
identify, based on each queried status, at least one processing constraint of each service component, by:
determining a maximum processing speed, maximum memory, and accessible network bandwidth of each service component based on each queried status; and
assigning, as the at least one processing constraint, a confidence score to each service component indicative of whether the deadline will be met based on the maximum processing speed, the maximum memory, and the accessible network bandwidth;
determine, by a machine learning algorithm, a service component combination from the plurality of service component combinations for executing the program operation, wherein the machine learning algorithm is configured to identify a respective service component combination that meets the at least one user constraint despite any processing constraints associated with respective service components of the respective service component combination; and
execute the program operation by the determined service component combination.

8. The system of claim 7, wherein the at least one processing constraint is identified based on a type of the at least one user constraint.

9. The system of claim 8, wherein the type of the at least one user constraint is financial, and wherein the at least one user constraint comprises a budget for completing the program operation, wherein the hardware processor is configured to identify at least one processing constraint of each service component by:
retrieving a pricing model that indicates various pricing options for performing each sub-operation of the plurality of sub-operations by each service component;
determining a respective cost for each of the plurality of service component combinations; and
assigning, as the at least one processing constraint, a budgetary score to each of the plurality of service component combinations indicative of whether the budget will be met based on the respective cost.

10. The system of claim 7, wherein the machine learning algorithm assigns weights to the at least one user constraint and the at least one processing constraint such that one constraint has a greater influence than another constraint.

11. The system of claim 7, wherein the status of each service component indicates an availability of each service component to perform a sub-operation, wherein the hardware processor is further configured to:
determine that a subset of service components are unavailable to perform the plurality of sub-operations such that the machine learning algorithm cannot determine an appropriate service component combination; and
in response to determining that the machine learning algorithm cannot determine an appropriate service component combination:
estimate when the subset of service components will be available;
determine a schedule that indicates when to select a given service component to perform a sub-operation of the plurality of sub-operations based on the estimation;
evaluate whether the schedule satisfies the at least one user constraint; and in response to determining that the schedule satisfies the at least one user constraint, execute the program operation in accordance with the schedule.

12. The system of claim 11, wherein the hardware processor is configured to transmit an error message for performing the program operation in response to determining that the schedule does not satisfy the at least one user constraint.

13. A non-transitory computer readable medium storing thereon computer executable instructions for scheduling program operations on cloud-based services, including instructions for:
receiving both a request to perform a program operation on a cloud-based service of a service provider and at least one user constraint for performing the program operation, wherein the at least one user constraint comprises a deadline for completing the program operation;
determining a plurality of sub-operations that are comprised in the program operation;
identifying a plurality of service component combinations offered by the service provider that can execute the program operation, wherein each of the plurality of service component combinations comprises at least one service component that can execute the plurality of sub-operations;
querying a status of each service component in the plurality of service component combinations;
identifying, based on each queried status, at least one processing constraint of each service component, by:
determining a maximum processing speed, maximum memory, and accessible network bandwidth of each service component based on each queried status; and
assigning, as the at least one processing constraint, a confidence score to each service component indicative of whether the deadline will be met based on the maximum processing speed, the maximum memory, and the accessible network bandwidth;
determining, by a machine learning algorithm, a service component combination from the plurality of service component combinations for executing the program operation, wherein the machine learning algorithm is configured to identify a respective service component combination that meets the at least one user constraint despite any processing constraints associated with respective service components of the respective service component combination; and
executing the program operation by the determined service component combination.

14. The non-transitory computer readable medium of claim 13, wherein the at least one processing constraint is identified based on a type of the at least one user constraint.

15. The non-transitory computer readable medium of claim 14, wherein the type of the at least one user constraint is financial, and wherein the at least one user constraint comprises a budget for completing the program operation, and wherein instructions for identifying at least one processing constraint of each service component comprise instructions for:
retrieving a pricing model that indicates various pricing options for performing each sub-operation of the plurality of sub-operations by each service component;
determining a respective cost for each of the plurality of service component combinations; and
assigning, as the at least one processing constraint, a budgetary score to each of the plurality of service component combinations indicative of whether the budget will be met based on the respective cost.

16. The non-transitory computer readable medium of claim 13, wherein the machine learning algorithm assigns weights to the at least one user constraint and the at least one processing constraint such that one constraint has a greater influence than another constraint.

17. The non-transitory computer readable medium of claim 13, wherein the status of each service component indicates an availability of each service component to perform a sub-operation, further comprising instructions for:
determining that a subset of service components are unavailable to perform the plurality of sub-operations such that the machine learning algorithm cannot determine an appropriate service component combination; and
in response to determining that the machine learning algorithm cannot determine an appropriate service component combination:
estimating when the subset of service components will be available;
determining a schedule that indicates when to select a given service component to perform a sub-operation of the plurality of sub-operations based on the estimation;
evaluating whether the schedule satisfies the at least one user constraint; and
in response to determining that the schedule satisfies the at least one user constraint, executing the program operation in accordance with the schedule.

* * * * *